(12) United States Patent
Zhang et al.

(10) Patent No.: US 8,427,843 B2
(45) Date of Patent: Apr. 23, 2013

(54) MOUNTING APPARATUS FOR EXPANSION CARDS

(75) Inventors: Guang-Yi Zhang, Shenzhen (CN); Tie-Shan Jiang, Shenzhen (CN)

(73) Assignees: Hong Fu Jin Precision Industry (ShenZhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 355 days.

(21) Appl. No.: 12/962,617

(22) Filed: Dec. 7, 2010

(65) Prior Publication Data

US 2012/0134091 A1  May 31, 2012

(30) Foreign Application Priority Data

Nov. 25, 2010  (CN) .......................... 2010 1 0558946

(51) Int. Cl.
*H05K 7/14* (2006.01)
*H05K 7/00* (2006.01)
*H05K 1/14* (2006.01)
*H05K 7/02* (2006.01)

(52) U.S. Cl.
USPC ...... 361/801; 361/679.32; 361/802; 361/803; 361/807; 361/809; 361/810

(58) Field of Classification Search ............. 361/679.32, 361/755, 801–803, 807, 809, 810
See application file for complete search history.

(56) References Cited

U.S. PATENT DOCUMENTS

| | | | | |
|---|---|---|---|---|
| 5,946,196 A | * | 8/1999 | Baek | 361/798 |
| 6,160,712 A | * | 12/2000 | Itai et al. | 361/759 |
| 7,326,077 B2 | * | 2/2008 | Shih et al. | 439/372 |
| 2004/0184252 A1 | * | 9/2004 | Lin et al. | 361/801 |
| 2004/0212975 A1 | * | 10/2004 | Chen et al. | 361/801 |
| 2009/0129002 A1 | * | 5/2009 | Wu et al. | 361/679.4 |
| 2009/0251856 A1 | * | 10/2009 | McCormick et al. | 361/679.32 |

* cited by examiner

*Primary Examiner* — Timothy Thompson
*Assistant Examiner* — Sherman Ng
(74) *Attorney, Agent, or Firm* — Altis Law Group, Inc.

(57) ABSTRACT

A mounting apparatus is adjusted to selectively mount a first expansion card or a second expansion card. The mounting apparatus includes a bracket, a retaining member fixed to the bracket, and a pivoting member pivotably attached to the retaining member. The pivoting member defines a first locking slot and a second locking slot. The pivoting member is pivotable along a first direction to limit the first expansion card. The pivoting member is pivotable along a direction opposing to the first direction to limit the second expansion card.

20 Claims, 8 Drawing Sheets

MOUNTING APPARATUS FOR EXPANSION CARDS

BACKGROUND

1. Technical Field

The disclosure relates to mounting apparatuses and, more particularly, to a mounting apparatus for mounting expansion cards.

2. Description of Related Art

Tall expansion cards are generally installed in a chassis of an electronic device, such as a computer or a server, with a mounting apparatus engaging with the cover plates attached to first ends of the expansion cards. Top portions of the tall expansion cards always require mounting apparatuses. However, each predetermined mounting apparatus is uniquely designed for a particular kind of tall expansion cards only.

BRIEF DESCRIPTION OF THE DRAWINGS

Many aspects of the present embodiments can be better understood with reference to the following drawings. The components in the drawings are not necessarily drawn to scale, the emphasis instead being placed upon clearly illustrating the principles of the present embodiments. Moreover, in the drawings, all the views are schematic, and like reference numerals designate corresponding parts throughout the several views.

DETAILED DESCRIPTION

The disclosure, including the accompanying drawings, is illustrated by way of examples and not by way of limitation. It should be noted that references to "an" or "one" embodiment in this disclosure are not necessarily to the same embodiment, and such references mean at least one.

Figure 1:
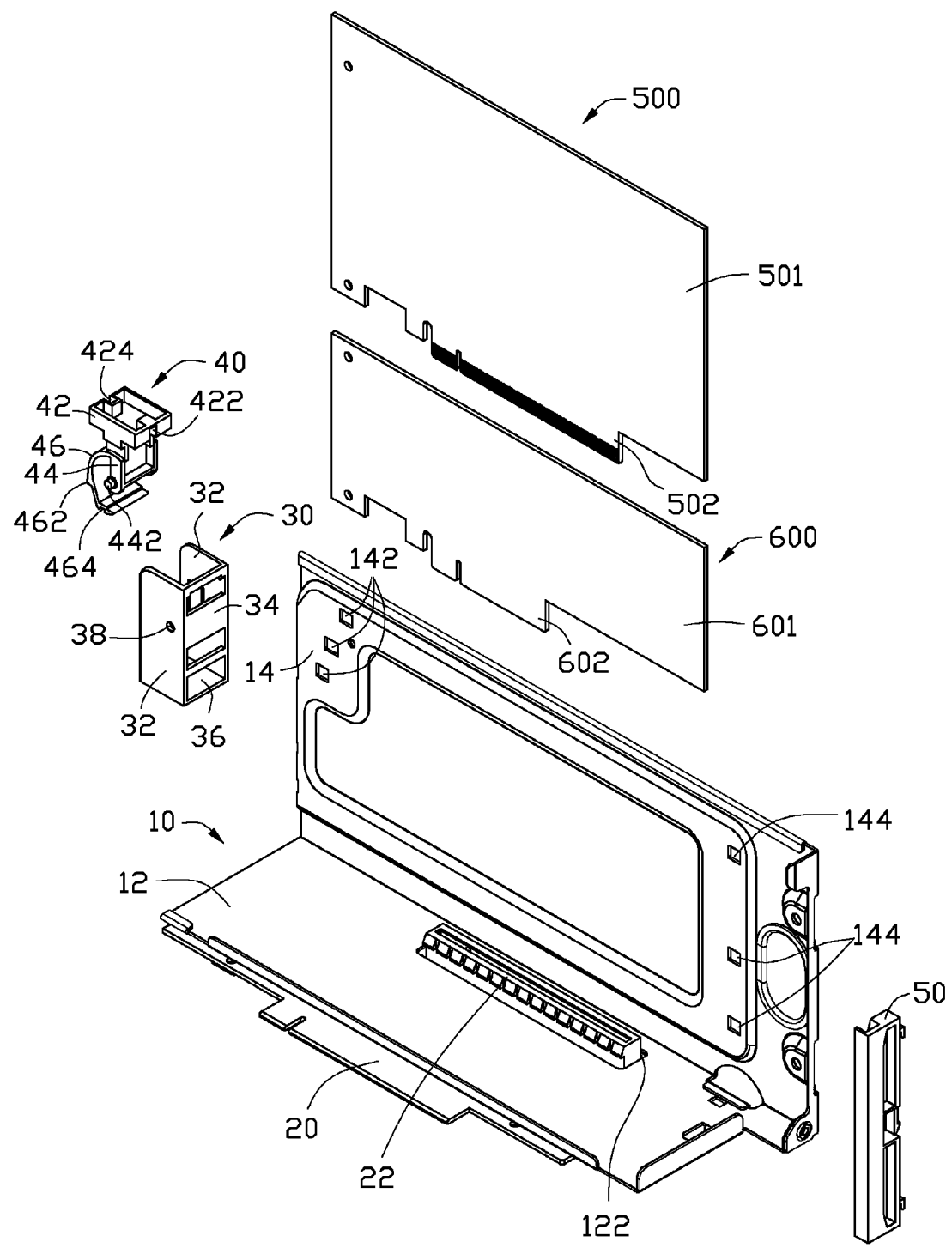
FIG. 1 is an exploded, isometric view of an exemplary embodiment of a mounting apparatus, together with a first expansion card and a second expansion card.
Figure 2:
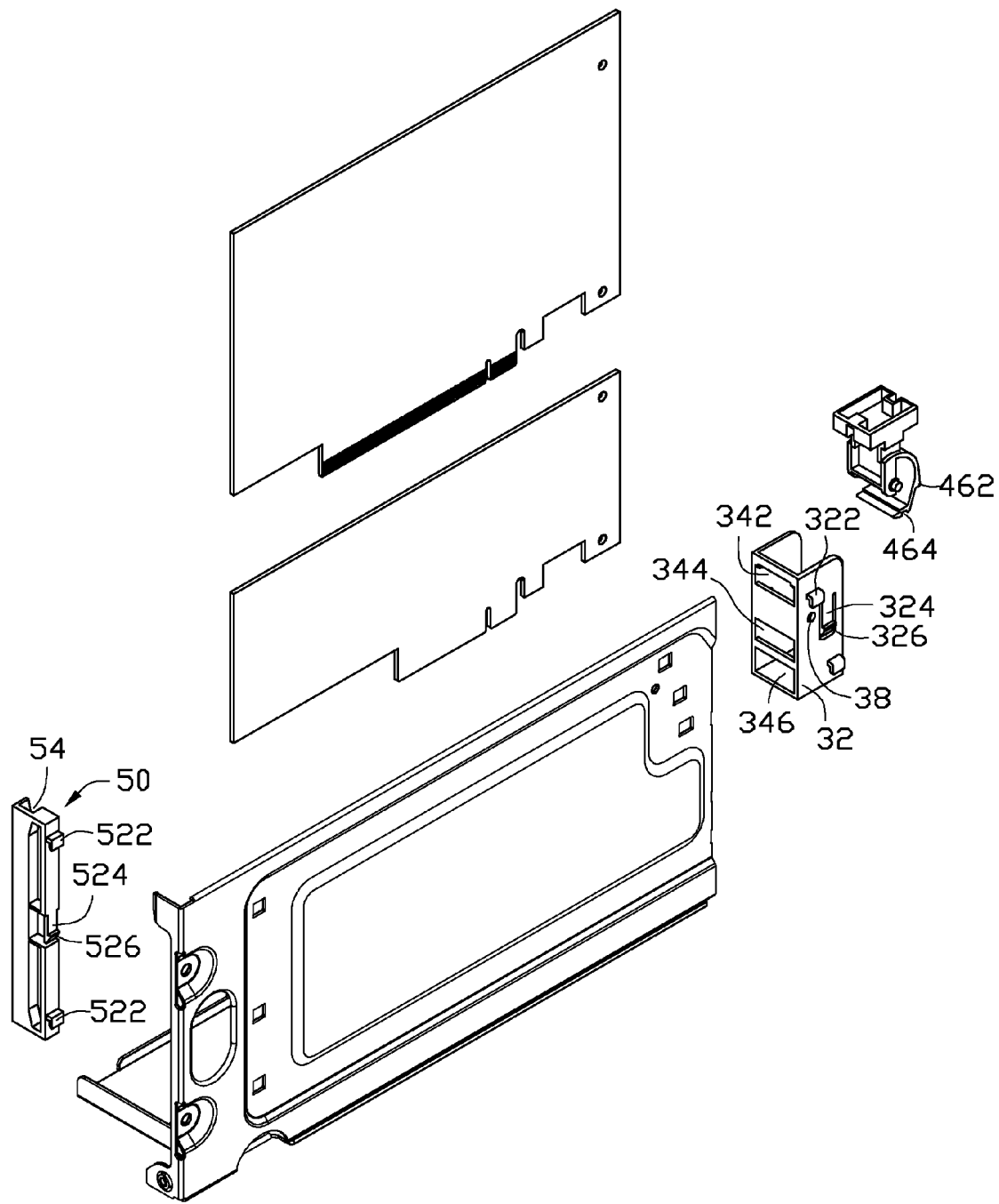
FIG. 2 is similar to FIG. 1, but viewed from another perspective.

Referring to FIGS. 1 and 2, an exemplary embodiment of a mounting apparatus is provided to selectively mount a first expansion card 500 or a second expansion card 600 of a different size. The mounting apparatus includes a bracket 10, a circuit board 20, a retaining member 30, a pivoting member 40, and a clip 50. The first expansion card 500 includes a main plate 501 and a plug 502. The second expansion card 600 includes a main plate 601 and a plug 602. The first expansion card 600 is taller than the second expansion card 600. The circuit board 20 includes a socket 22.

The bracket 10 includes a base wall 12, and a sidewall 14 substantially perpendicularly extending up from one side of the base wall 12. The circuit board 20 is mounted below the base wall 12. The base wall 12 defines a through slot 122 through which the socket 22 of the circuit board 20 extends. The sidewall 14 defines three first mounting holes 142 in a first end of the sidewall 14, and defines three second mounting holes 144 in a second end of the sidewall 14 opposite to the first end.

Figure 4:
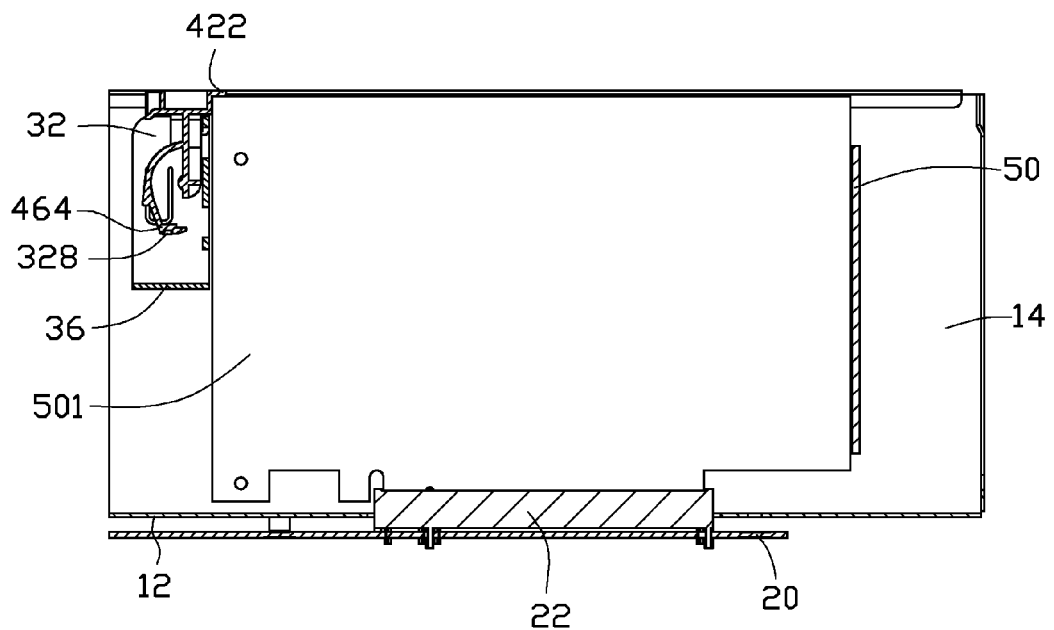
FIG. 4 is a cross-sectional view of FIG. 3, taken along the line IV-IV.

The retaining member 30 includes two parallel side plates 32 and a connecting plate 34 substantially perpendicularly connected between corresponding sides of the side plates 32. A reinforcement plate 36 is substantially perpendicularly connected between bottom ends of the side plates 32. Each side plate 32 defines a pivoting hole 38. Two substantially L-shaped hooks 322 and a substantially resilient first tongue-shaped portion 324 between the hooks 322 are formed on an outer surface of one of the side plates 32. A first tenon 326 is formed from a distal end of the first tongue-shaped portion 324. A positioning post 328 is formed from an inner surface of one of the side plates 32, as shown in FIG. 4. The connecting plate 34 defines a locking hole 342, a first through hole 344, and a second through hole 346 in order from top to bottom.

The pivoting member 40 is substantially T-shaped, and includes a pressing portion 42 at a top of the pivoting member 40 and a pivoting portion 44 extending down from a middle of a bottom of the pressing portion 42. The pressing portion 42 defines a first locking slot 422 and a second locking slot 424 at opposite ends of the pressing portion 42. Two pins 442 extend from opposite sides of a lower portion of the pivoting portion 44. The top of the first locking slot 422 is sealed, and the bottom of second locking slot 424 also sealed. A substantially C-shaped resilient portion 46 extends from a middle portion of the pivoting portion 44 to partially surround the pivoting portion 44. The resilient portion 46 includes an operating section 462 formed at a middle portion of the resilient portion 46 opposite to the pivoting portion 44, and a positioning section 464 formed at a distal end of the resilient portion 46 opposite to the pivoting portion 44. In this embodiment, the positioning section 464 is a slot defined in the resilient portion 46.

The clip 50 is substantially bar-shaped. Two substantially L-shaped hooks 522 and a resilient second tongue-shaped portion 524 between the hooks 522 are formed on a first side surface of the clip 50. A second tenon 526 is formed from a distal end of the second tongue-shaped portion 524. A clip slot 54 is defined in a second side surface of the clip 50 substantially perpendicularly connected to the first side surface.

Figure 3:
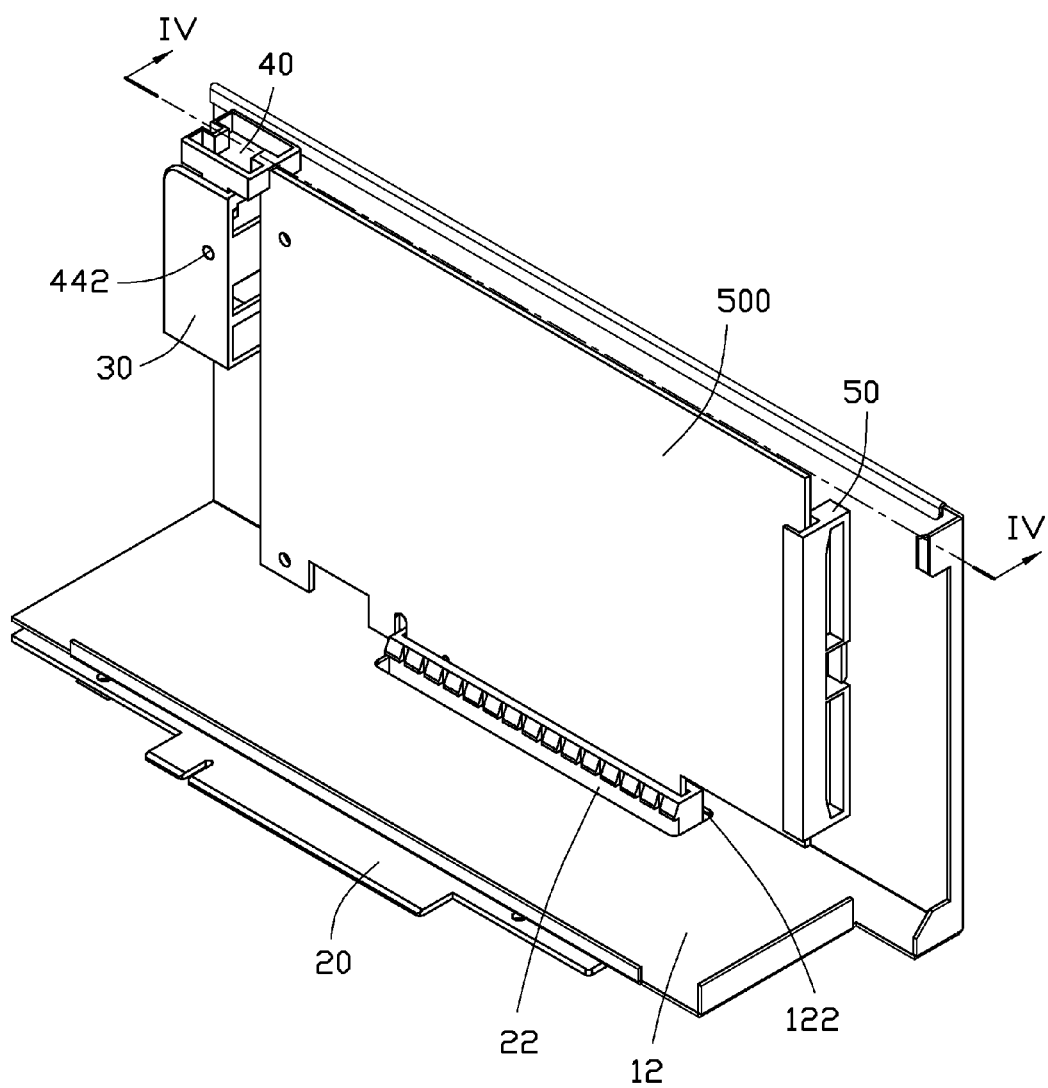
FIG. 3 is an assembled, isometric view of the mounting apparatus of FIG. 1 and the first expansion card.

Referring to FIGS. 3 and 4, in assembly, the circuit board 20 is attached to the base wall 12 of the bracket 10, below the base wall 12, with the socket 22 of the circuit board 20 extending through the through slot 122 of the base wall 12. The pins 442 of the pivoting member 40 engage in the pivoting holes 38 of the side plates 32 respectively, to pivotably attach the pivoting member 40 to the retaining member 30. The hooks 322 of the retaining member 30 are locked in two of the first mounting holes 142 of the sidewall 14, then the retaining member 30 is slid down until the first tenon 326 of the first tongue-shaped portion 324 engages in the third first through holes 142 of the sidewall 14. Therefore, the retaining member 30 is fixed to the sidewall 14. The clip 50 is fixed to the sidewall 14 through the second mounting holes 144 of the sidewall 14, and the hooks 522 and the second tenon 526 of the clip 50 has the same steps as described above.

Figure 5:
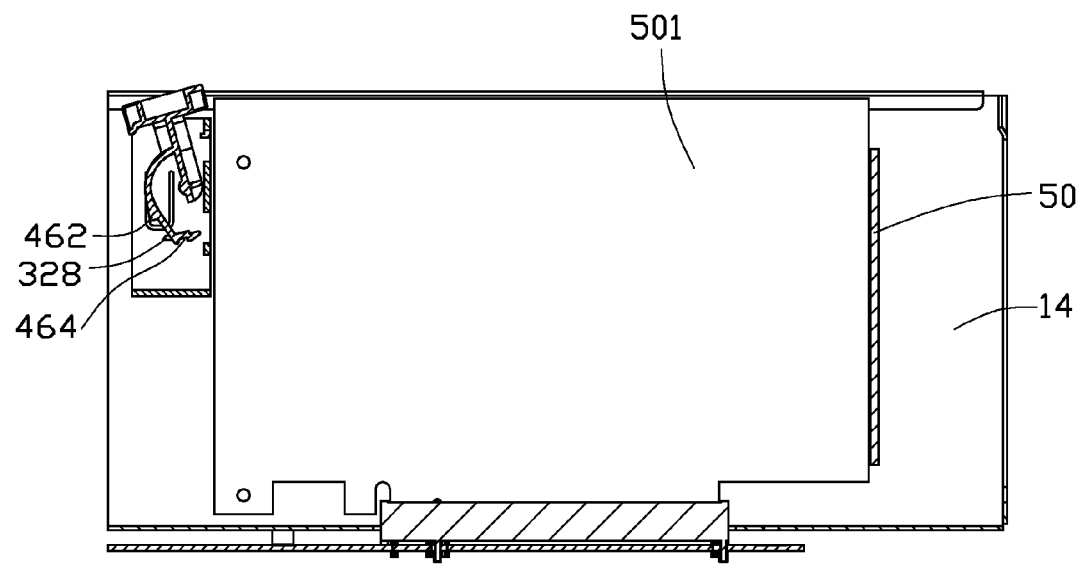
FIG. 5 is similar to FIG. 4, but showing another state of use.

Referring to FIG. 3 to FIG. 5, to attach the first expansion card 500 to the bracket 10, the plug 502 of the first expansion card 500 is plugged in the socket 22 of the circuit board 20. A first end of the main plate 501 is received in the clip slot 54 of the clip 50. The pivoting member 40 is pivoted up toward the second end of the main plate 501, to make a conjunction of a second end and a top side of the main plate 501 engage in the first locking slot 422 of the pivoting member 40, with the top of the first locking slot 422 pressing the top side of the main plate 501. The positioning section 464 of the pivoting member 40 is locked to the positioning post 328 of the retaining member 30, to avoid the pressing portion 42 releasing from the main plate 501. Thus the first expansion card 500 is fixed to the bracket 10.

Referring to FIG. 5, to detach the first expansion card 500 from the bracket 10, the operating section 462 of the pivoting member 40 is pressed to deform the resilient portion 46 to release the positioning section 464 from the positioning post 328 of the retaining member 30. The pivoting member 40 is then pivoted down away from the first expansion card 500, to release the pressing portion 42 from the main plate 501. Therefore, the plug 502 of the first expansion card 500 is readily removed from the socket 22 of the circuit board 20.

Figure 6:
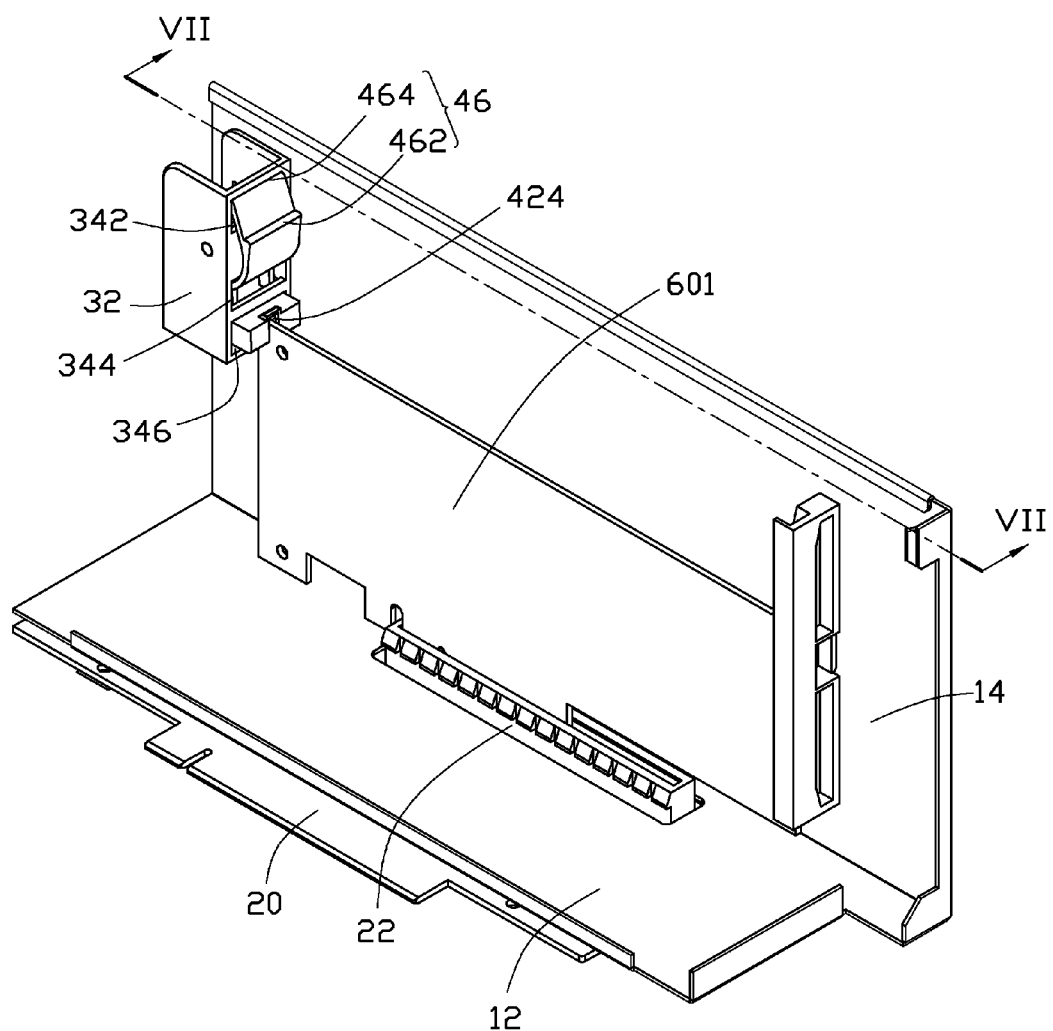
FIG. 6 is an assembled, isometric view of the mounting apparatus of FIG. 1 and the second expansion card.
Figure 7:
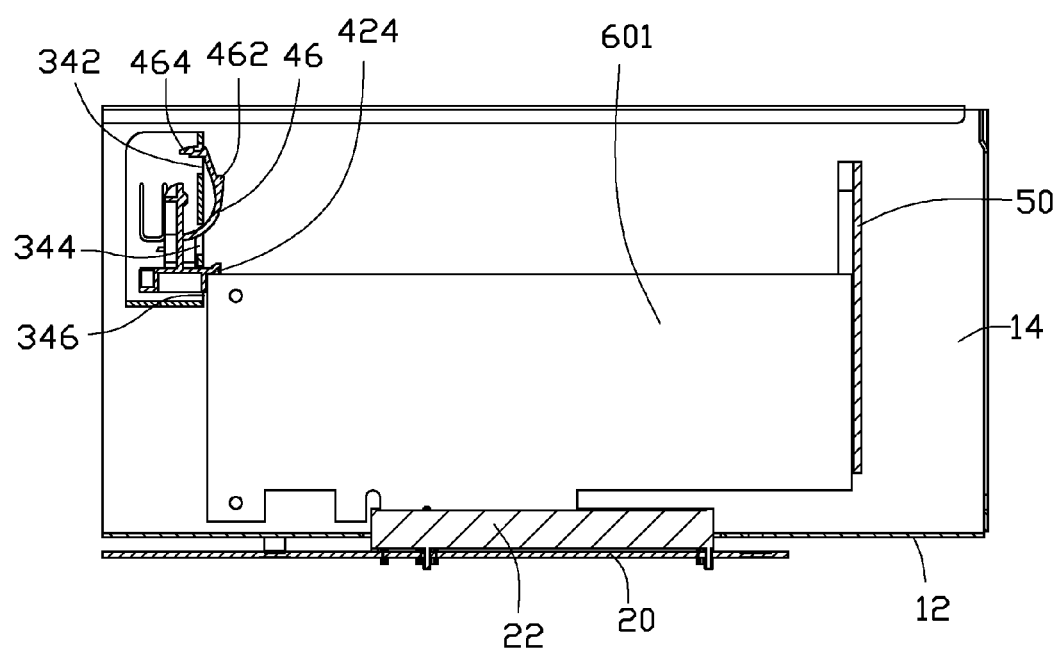
FIG. 7 is a cross-sectional view of FIG. 6, taken along the line VII-VII.

Referring to FIGS. 6 and 7, to attach the second expansion card 600 to the bracket 10, the plug 602 of the second expansion card 600 is plugged into the socket 22 of the circuit board 20. A first end of the main plate 601 is received in the clip slot 54 of the clip 50. The pivoting member 40 is pivoted down, to make the resilient portion 46 extend through the first through hole 344 of the retaining member 30, and one end of the pressing portion 42 extends through the second through hole 344 of the retaining member 30. A conjunction of a second end and a top side of the main plate 601 is engaged in the second locking slot 424 of the pivoting member 40, with the bottom (now on top) of the second locking slot 424 pressing the top side of the main plate 601. A top side bounding the locking hole 342 of the retaining member 30 is engaged in the positioning section 464 of the pivoting member 40, to stop the pressing portion 42 releasing from the main plate 601. Thus the second expansion card 600 is fixed to the bracket 10.

Figure 8:
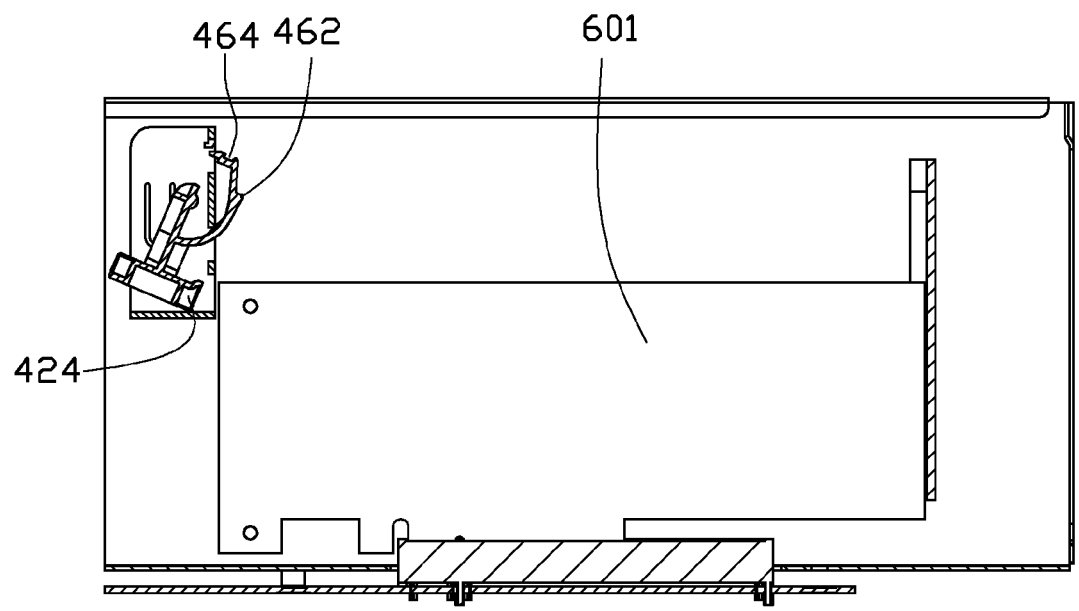
FIG. 8 is similar to FIG. 7, but showing another state of use.

Referring to FIG. 8, to detach the second expansion card 600 from the bracket 10, the operating section 462 of the pivoting member 40 is pressed to deform the resilient portion 46 to release the positioning section 464 from the top side bounding the locking hole 342 of the retaining member 30. The pivoting member 40 is then pivoted up, to release the pressing portion 42 from the main plate 601.

In this embodiment, the clip 50 assists to the fixing of the expansion cards. It is possible to fix the expansion cards to the bracket 10 only using the retaining member 30 and the pivoting member 40, and not use the clip 50.

In alternative embodiments, the connecting plate 34 may defines a larger through hole to substitute the locking hole 342, the first through hole 344, and the second through hole 346.

It is to be understood, however, that even though numerous characteristics and advantages of certain embodiments have been set forth in the foregoing description, together with details of the structures and functions of the embodiments, the disclosure is illustrative only, and changes may be made in detail, especially in matters of shape, size, and arrangement of parts within the principles of the disclosure to the full extent indicated by the broad general meaning of the terms in which the appended claims are expressed.

What is claimed is:

1. A mounting apparatus for selectively mounting a first expansion card or a second expansion card lower than the first expansion card, the mounting apparatus comprising:
   a bracket;
   a retaining member fixed to the bracket and comprising a positioning post, the retaining member also defining a locking hole; and
   a pivoting member pivotably attached to the retaining member and comprising a pressing portion and a resilient portion, wherein the pressing portion defines a first locking slot and a second locking slot in opposite sides of the pressing portion, a positioning section is formed on the resilient portion;
   wherein when attaching the first expansion card to the bracket, the pivoting member is rotated along a first direction, the first locking slot of the pressing portion limits the first expansion card, the positioning section of the pivoting member is locked to the positioning post of the retaining member to avoid the pressing portion releasing from the first expansion card; and
   wherein when attaching the second expansion card to the bracket, the pivoting member is rotated along a second direction opposing to the first direction, the second locking slot of the pressing portion limits the second expansion card, the positioning section of the pivoting member is locked to the locking hole of the retaining member to avoid the pressing portion releasing from the second expansion card.

2. The mounting apparatus of claim 1, wherein the bracket comprises a base wall, and a sidewall perpendicularly extending from one side of the base wall, the retaining member is fixed to the sidewall.

3. The mounting apparatus of claim 2, further comprising a circuit board with a socket formed thereon, the base wall defines a through slot through which the socket of the circuit board extends.

4. The mounting apparatus of claim 2, wherein the sidewall defines three first mounting holes in a first end of the sidewall, the retaining member comprises two parallel side plates, two substantially L-shaped hooks and a tongue-shaped portion between the hooks are formed on an outer surface of one of the side plates, a tenon is formed from a distal end of the tongue-shaped portion, the hooks of the retaining member are locked in two of the first mounting holes of the sidewall, the tenon of the tongue shaped portion engages in the third first mounting holes of the sidewall.

5. The mounting apparatus of claim 2, further comprises a clip fixed to the sidewall opposing to the retaining member, a clip slot is defined in the clip for receiving an edge of the first expansion card or the second expansion card.

6. The mounting apparatus of claim 1, wherein the retaining member comprises two parallel side plates and a connecting plate connected between the side plates, each of the side plates defines a pivoting hole, the pivoting member comprises a pivoting portion, two pin extend from opposite sides of the pivoting portion and pivotably engage in the pivoting holes of the retaining member for pivotably attached the pivoting member to the retaining member.

7. The mounting apparatus of claim 6, wherein the positioning post is formed from an inner surface of one of the side plates, the locking hole is defined in the connecting plate.

8. The mounting apparatus of claim 1, wherein the pivoting member is substantially T-shaped, the pressing portion is formed on a top of the pivoting member, a pivoting portion extends downward from a middle of a bottom of the pressing portion, the pivoting member is pivotably attached to the retaining member through the pivoting portion.

9. The mounting apparatus of claim 8, wherein the resilient portion is substantially C-shaped and extends down from a middle of the pivoting portion.

10. The mounting apparatus of claim 9, wherein the resilient portion comprises an operating section formed at a middle of the resilient portion opposite to the pivoting portion, the positioning section is formed at a distal end of the resilient portion opposite to the pivoting portion.

11. The mounting apparatus of claim 10, wherein the positioning section is a slot defined in the resilient portion.

12. An electronic device for selectively mounting a first expansion card or a second expansion card lower than the first expansion card, the electronic device comprising:
- a bracket comprising a base wall and a sidewall substantially perpendicularly extending from one side of the base wall;
- a circuit board attached to the bracket, the circuit board comprising a socket formed thereon;
- a retaining member fixed to the sidewall of the bracket and comprising a first positioning part and a second positioning part; and
- a pivoting member pivotably attached to the retaining member and comprising a pressing portion and a resilient portion, wherein the pressing portion comprises a first limit part and a second limit part, a positioning section is formed on the resilient portion;
- wherein when attaching the first expansion card to the bracket, the pivoting member is rotated along a first direction, the first limit part of the pressing portion limits the first expansion card, the positioning section of the pivoting member is locked to the first positioning part of the retaining member to avoid the pressing portion releasing from the first expansion card; and
- wherein when attaching the second expansion card to the bracket, the pivoting member is rotated along a second direction opposing to the first direction, the second limit part of the pressing portion limits the second expansion card, the positioning section of the pivoting member is locked to the second positioning part of the retaining member to avoid the pressing portion releasing from the second expansion card.

13. The electronic device of claim 12, wherein the circuit board is arranged below the base wall of the bracket, the base wall defines a through slot through which the socket of the circuit board extends.

14. The electronic device of claim 12, wherein the retaining member comprises two parallel side plates and a connecting plate connected between the side plates, each of the side plates defines a pivoting hole, the pivoting member comprising a pivoting portion, two pins extend from opposite sides of the pivoting portion and pivotably engage in the pivot holes of the retaining member for pivotably attached the pivoting member to the retaining member.

15. The electronic device of claim 14, wherein the first positioning part is a positioning post formed from an inner surface of one of the side plates, the second positioning part is a locking hole defined in the connecting plate.

16. The electronic device of claim 12, further comprising a clip fixed to the sidewall opposing to the retaining member, wherein a clip slot is defined in the clip for receiving an edge of the first expansion card or the second expansion card.

17. The electronic device of claim 12, wherein the pivoting member is substantially T-shaped, the pressing portion is formed on a top of the main body, a pivoting portion extends downward from a middle portion of the pressing portion, the pivoting member is pivotably attached to the retaining member through the pivoting portion.

18. The electronic device of claim 17, wherein the resilient portion is substantially C-shaped and extends down from a middle portion of the pivoting portion.

19. The electronic device of claim 18, wherein the resilient portion comprises an operating section formed at a middle portion of the resilient portion opposite to the pivoting portion, the positioning section is formed at a distal end of the resilient portion opposite to the pivoting portion.

20. The electronic device of claim 19, wherein the positioning section is a slot defined in the resilient portion.

* * * * *